July 14, 1970   SHIGEO KANAI ET AL   3,520,087
METHOD AND APPARATUS FOR CONCURRENTLY GRINDING THE TEETH
OF A PLURALITY OF GEAR STOCK MEMBERS
Filed March 14, 1968
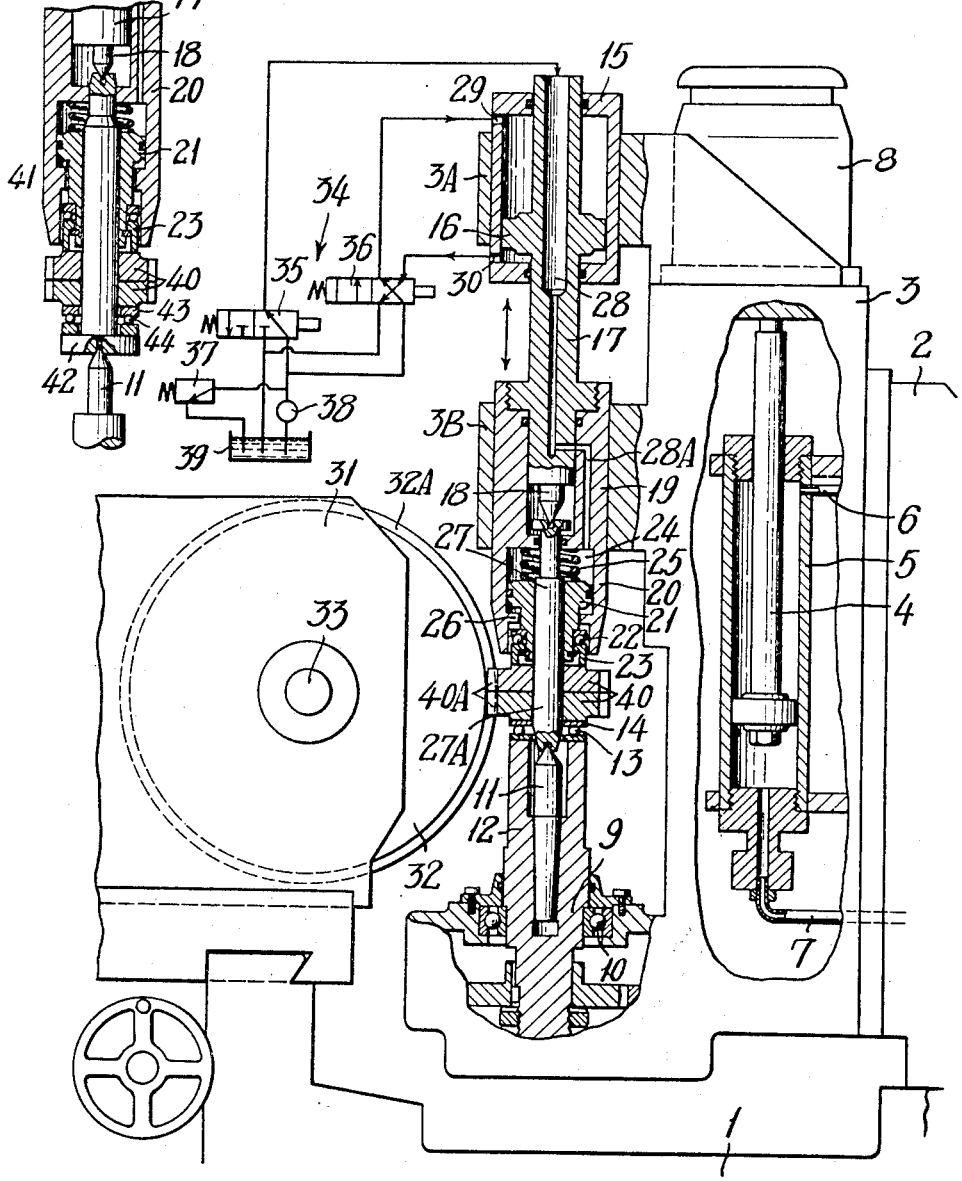
INVENTORS
Shigeo Kanai
Yukiyasu Nakamura

United States Patent Office 3,520,087
Patented July 14, 1970

3,520,087
METHOD AND APPARATUS FOR CONCURRENTLY GRINDING THE TEETH OF A PLURALITY OF GEAR STOCK MEMBERS
Shigeo Kanai, Yamato-machi, Kitaadachi-gun, and Yukiyasu Nakamura, Sayama-shi, Japan, assignors to Honda Giken Kogyo Kabushiki Kaisha, Tokyo, Japan
Filed Mar. 14, 1968, Ser. No. 713,013
Claims priority, application Japan, Mar. 20, 1967, 42/17,046
Int. Cl. B24b 1/00, 3/00
U.S. Cl. 51—95
10 Claims

ABSTRACT OF THE DISCLOSURE

A grinding method and apparatus in which a plurality of gear stock members are supported on a common shaft one above another and are lightly held together and angularly positioned by a rotating spiral grindstone meshing with the teeth until the teeth of the gear members are coincident whereafter the gear members are tightly clamped together and axially reciprocated and rotated to grind the teeth by the spiral grindstone.

BRIEF SUMMARY OF THE INVENTION

The invention relates to a method and apparatus for grinding the teeth of a plurality of gear stock members at the same time.

Heretofore, a plurality of gear stock members have been mounted one above another on a core shaft and ground together by a spiral grindstone and it has been the usual practice to align the teeth of the gear members in coincidence one with another accurately by using a setting jig, and thereafter the gear members are integrally fixed together with the core shaft for being ground. Accordingly, not only is a high accuracy setting jig required, but also a high degree of skill is necessary for correctly using the jig. The working efficiency is thus greatly limited.

An object of the present invention is to provide a grinding process and apparatus which is free from the above requirements and it is characterized by an arrangement wherein a plurality of gear stock members are mounted one above another on a core shaft so as to be individually rotatable thereon, after which a rotating spiral grindstone is meshed with the gear members to cause the teeth of the gear members and the spiral portion of the spiral grindstone to be coincident one with another whereafter the gear members are clamped together as a unit and the teeth are ground for all the gear members in a single operation.

BRIEF DESCRIPTION OF THE DRAWING

FIG. 1 is a sectional side view of an embodiment of grinding apparatus according to the present invention, and FIG. 2 is a sectional side view showing a modification of a core shaft portion of the embodiment of FIG. 1.

DETAILED DESCRIPTION

In the drawing numeral 1 denotes a machine base, and numeral 2 denotes a supporting column thereon. A frame body 3 is slidably attached to the supporting column 2 for vertical movement. A piston 4 secured to the frame body 3 is mounted slidably in a cylinder 5 secured to the supporting column 2, so that the frame body 3 may be reciprocally moved up and down by supplying oil from a pressure oil source alternately to oil conduits 6 and 7 which are in communication with the cylinder 5. Numeral 9 denotes a driving shaft supported by a bearing 10 on the lower portion of the frame body 3, and shaft 9 is driven by an electric motor 8 mounted on the frame body 3 through a transmission (not shown). A driving center 11 is mounted in and secured to the driving shaft 9 so as to extend upwardly. Numeral 12 is a supporting tube integrally projecting upwardly from the driving shaft 9 so as to surround the driving center 11, and the upper surface of tube 12 supports an annular rotating plate 14 through a bearing 13. Numeral 15 denotes a main cylinder fixedly supported by an arm 3A projecting from the frame body 3. A piston 16 is slidably mounted in cylinder 15 and an elevating shaft 17 is fixed to the piston 16. The shaft 17 carries a fixedly secured center 18 at its lower end. A tubular shaft 19 is fixed to the lower end of the elevating shaft 17 and is slidably mounted in an arm 3B projecting from the frame body 3. A subsidiary cylinder 20 is connected to the lower end of shaft 19. An annular piston 21 is slidably mounted in cylinder 20, and the lower end of piston 21 carries a rotatable pressure ring 23 through a bearing 22. A chamber 24 is formed within the subsidiary cylinder 20, and there is contained therein a spring 25 which urges the annular piston 21 downwards. Numeral 26 is an annular abutment for limiting the degree of downward movement of the annular piston 21.

A core shaft 27 which is to be supported by the two centers 11 and 18 is supported at its upper end by the lower end of the tubular shaft 19 so as to be lightly engaged and therefore slidable up and down. The middle portion of the core shaft 27 is slidably mounted in the annular piston 21 and the lower portion of the core shaft extends downwards beyond the pressure ring 23 to form a mounting portion 27A for raw material gear stock which is to be ground. An oil passage 28 is formed in the elevating shaft 17, and the passage 28 is in communication with the subsidiary cylinder chamber 24 through an oil passage 28A in the tubular shaft 19. Numerals 29 and 30 are oil passages in the main cylinder 15.

Numeral 31 is a movable tool base attached to the machine base 1, and the tool base 31 has a spiral grindstone 32 rotatably supported thereon at shaft 33.

The supply and discharge of oil in oil passages 28, 29 and 30 may be effected by oil supply control apparatus 34. This apparatus 34 may comprise, for example, an automatic switch valve 35 for the oil passage 28, an automatic switch valve 36 for the oil passages 29, 30, a pressure regulating valve 37, a pump 38, and an oil tank 39.

The grinding apparatus operates as follows:

The elevating shaft 17 is first moved upwards by supplying oil to the oil passage 30, and then a plurality of gear stock members 40, are mounted, one above another, on the mounting portion 27A of the core shaft 27 from below. Then, the elevating shaft 17 is lowered by supplying oil to the oil passage 29 until the core shaft 27 is held between the centers 11 and 18. Simultaneously, the gear members 40, are held under light pressure between the rotating plate 14 and the pressure ring 23 and this compressive holding is effected by the spring 25, so that the gear members 40, may be rotated individually in relation to the core shaft 27. The teeth 40a of the gear members 40, are caused to roughly coincide at this stage, or previously at the stage when the members 40 are being mounted on the core shaft 27. Then, the spiral grindstone 32 is driven in rotation, and the spiral portion 32A thereof is meshed with the teeth 40a, of the gear members 40. By this meshing, each of the gear members 40 may be slightly rotated in relation to the core shaft 27 so that each tooth 40a is in substantial coincidence with the spiral portion 32A. Hereupon, the subsidiary cylinder chamber 24 is supplied with oil through the oil passage 28 so that by the pressure thereof the gear members 40 are pressed together with substantial force and are virtually immovably locked together on mounting portion 27A. Subsequently, the driving center 11 is rotated synchronously with the spiral grindstone 32 and at the same time, the frame body 3, and accordingly, the gear members 40 are reciprocally moved up and down to effect a grinding operation in almost the same manner as in the conventional case.

Thus, according to the invention, a plurality of gear members are mounted on a core shaft, one above another in succession, so as to be individually rotatable, and the spiral portion of a grindstone which is being rotated, is caused to mesh with the teeth of the gear members so that the phase of those teeth and that of the spiral portion automatically are brought into substantial coincidence. Accordingly, any special operation for the phase coincidence of the gear members becomes unnecessary and the working efficiency is improved. If, however, grinding is now effected without any further action, the gear members are rotated individually about the core shaft by being subjected to small vibrations of the grindstone, so that a large amount of unequal grinding is effected resulting in low grinding accuracy. In the process of the invention, however, the gear members are clamped together after the phase coincidence is achieved, so that they rotate together as if they were an integral body, thereby avoiding unequal grinding whereby ground gears of high accuracy are obtained. This has remakable industrial advantage.

In order that the spiral portion of the grindstone be brought into mesh with the teeth of the gear members at the time of achievement of phase coincidence thereof as mentioned above, the spiral portion 32 may be meshed either from the top of the teeth 40a towards the bottom of the same, or from the side of the teeth. In this case, the driving center 11 may be rotated and the gear members may be reciprocated up and down. The core shaft 27 is inseparable from the elevating shaft 17 in the embodiment of FIG. 1, but the core shaft 27 may be made separable as shown in FIG. 2. Namely, in FIG. 2, the core shaft 41 is so constructed that the shaft 41 can be inserted into the pressure ring 23, and the piston 21 from below, a rotating place 43 being placed through a ball bearing 44 on a supporting plate 42 provided at the lower end of the core shaft 41. If a large number of core shafts 41 of this type are prepared with gear members 40 mounted one above another thereon, with the teeth thereof roughly coincident, the replacement of fresh raw stock can be carried out rapidly after the completion of the grinding of previous gear members.

What is claimed is:
1. A process for grinding the teeth of a plurality of gear members, said process comprising mounting a plurality of gear members, one above another on a common shaft, applying light pressure to the gear members to hold the same togeher while enabling each gear member to be rotatably moved relative to the others, meshing a rotating spiral grindstone with the gear members thereby to cause the teeth of the gear members to be substantially coincident, and then clamping the gear members together with substantial pressure so that they rotate together, after which the gear members are driven in rotation and reciprocation in synchronism with the rotation of the spiral grindstone to effect grinding of the teeth of the gear members.

2. A process as claimed in claim 1, wherein said gear members are initially placed on the shaft with their teeth in approximate coincidence.

3. Apparatus for grinding the teeth of a plurality of gear members, said apparatus comprising a shaft on which are rotatably mounted a pluraltiy of gear members, one adjacent another, means for applying light pressure against the gear members to hold the same together while enabling each gear member to be rotatably moved on said shaft relative to the others, a rotatable spiral grindstone adjacent said shaft for meshing with the teeth of the gear members to produce substantial coincidence therebetween, means for applying substantial pressure to the gear members to clamp the same together for common rotation after the teeth have been brought into coincidence, and means for driving the thus clamped members together in rotation and axial reciprocation in synchronism with rotation of the grindstone to effect grinding of the teeth of the gear members.

4. Apparatus as claimed in claim 3, wherein said means for applying light pressure comprises a spring member.

5. Apparatus as claimed in claim 3, wherein said means for driving the members in rotation and axial reciprocation comprises a rotatably driven shaft supporting said gear members, means supported for rotation and axial displacement on a side of the gear members opposite said driven shaft for engaging the gear members under the action of the light pressure or the substantial pressure, and means for axially reciprocating the rotatably driven shaft and the gear members therewith.

6. Apparatus as claimed in claim 5, wherein said means supported for rotation and axial displacement comprises a piston and a cylinder slidably receiving the piston, a frame supporting said cylinder for sliding and rotatable movement, means coupled to the piston for contacting the gear members on a side thereof opposite said driven shaft, said means for applying light pressure to the gear members comprising a spring member in said cylinder acting on the piston to urge the means coupled thereto against the gear members, said means for applying substantial pressure to the gear members comprising means for supplying pressure fluid to said cylinder to urge the piston and the means coupled thereto against the gear members, said shaft on which the gear members are mounted being slidably engaged with said piston.

7. Apparatus as claimed in claim 6, wherein said shaft on which the gear members are mounted is freely insertable into said piston and includes a head plate on which the gear members can rest.

8. Apparatus as claimed in claim 5 comprising means preventing removal from said cylinder of said shaft on which the gear members are mounted.

9. Apparatus as claimed in claim 5, wherein said shaft on which the gear members are mounted is engaged with friction by said cylinder.

10. Apparatus as claimed in claim 9, wherein said shaft on which the gear members are mounted is vertically positioned and the gear members are placed one above another on said shaft.

References Cited

UNITED STATES PATENTS 2,424,191  7/1947  Rickenmann _____ 51—95

FOREIGN PATENTS 561,683  5/1944  Great Britain.

JAMES L. JONES, JR., Primary Examiner

U.S. Cl. X.R.

51—287